April 25, 1967  R. L. SILBERMAN  3,316,451
INTERVALOMETER

Filed Dec. 7, 1964  2 Sheets-Sheet 1

INVENTOR.
ROBERT L. SILBERMAN
BY Bair, Freeman
& Molinare Attys.

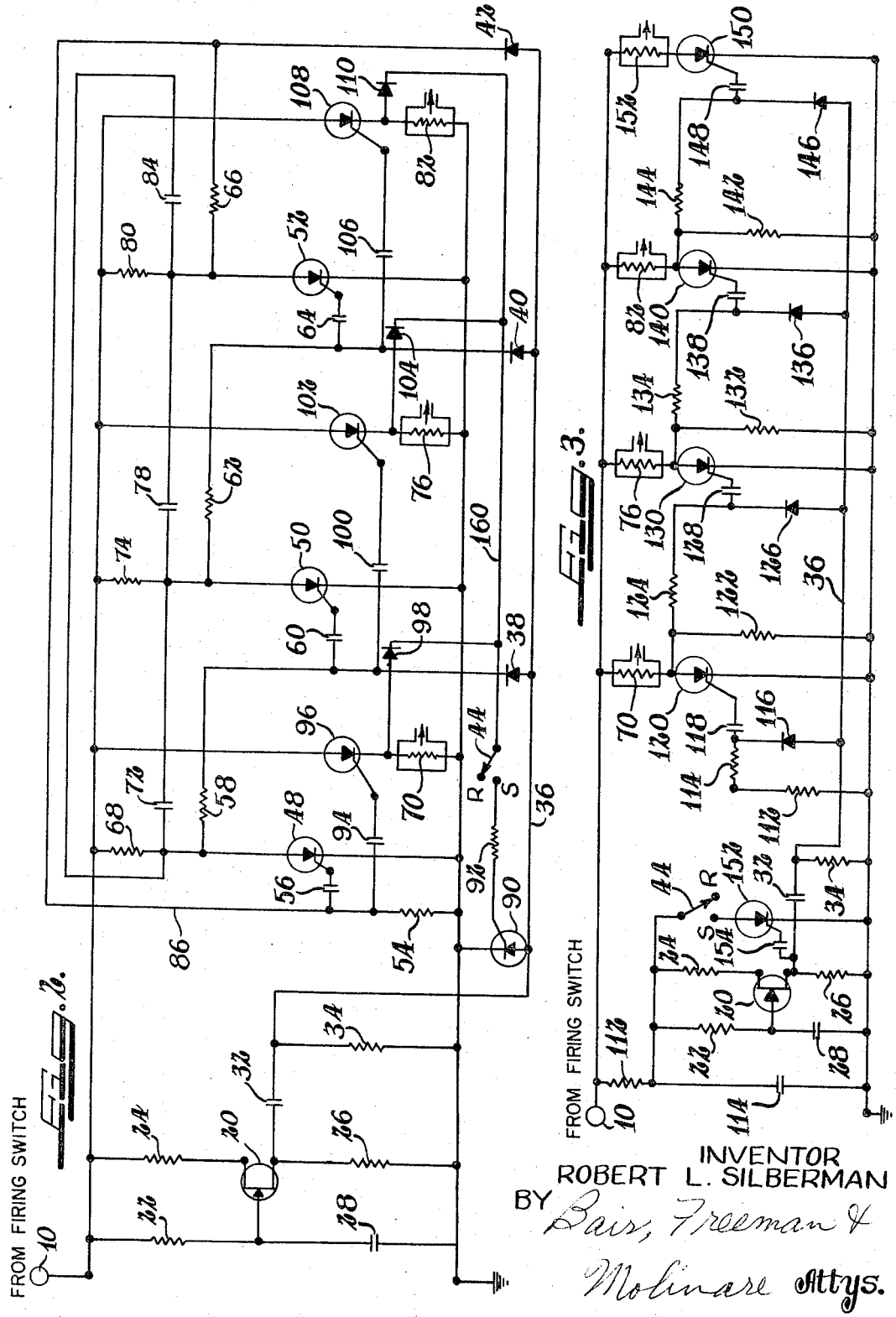

United States Patent Office 3,316,451
Patented Apr. 25, 1967

3,316,451
INTERVALOMETER
Robert L. Silberman, 470 Groveland,
Highland Park, Ill. 61535
Filed Dec. 7, 1964, Ser. No. 416,406
10 Claims. (Cl. 317—80)

This invention relates generally to a new and improved intervalometer apparatus, and more particularly to a novel circuit for selectively providing either a single event initiating signal or a sequence of event initiating signals, wherein the interval between the sequential signals may be controlled to a desired value.

It will be appreciated that there are many different types of devices which provide a series of operations or events in a desired sequence and with a controlled interval therebetween. Such devices are commonly known as intervalometers. For the purpose of illustrating the unique principles of the present invention, it will be described herein as embodied in an airborne multiple rocket launcher intervalometer, although it will be understood that this invention may advantageously be utilized in various other types of equipment.

Those familiar with present day airborne multiple rocket launches know that unless the firing pulses to the individual rockets are properly spaced during multiple fire (spaced firing being known as "ripple fire" and simultaneous detonation of all rockets being known as "salvo fire"), all rockets will exit from the rocket launcher almost simultaneously as in salvo fire.

Also, all airborne rockets have folding stabilizing fins in the rear of the rockets, and upon exiting the rocket launcher they open away from the body of the rocket and strike the opening fins or the rocket motor body of adjacent rockets. In so striking an adjacent rocket or rocket fins, the rockets are deflected from the sighted path of the target and, in addition, fins have been known to break off of the rockets and endanger the aircraft due to the possibility of a loose rocket fin being sucked into the jet turbine. There have also been cases where the rockets have been sufficiently deflected from the target path as to literally turn 180 degrees from the target path and return at the aircraft.

In addition to the proper spacing during multiple fire, a long needed requirement for such rocket launchers has been the ability to preselect either ripple fire or single rocket fire. Single rocket fire is desirable for training purposes and for slower flying aircraft, such as T-28 fixed wing aircraft and rotary wing aircraft. For slower flying aircraft, the ability to fire rockets singly and return for a second pass at the target is desirable.

Until the present time, all airborne rocket launchers have depended upon electro-mechanical devices or crude voltage divider devices, which act as a fire spacing control during ripple fire. These devices are bulky and are subject to inherent malfunction due to the extreme environment in which they operate, caused by altitude temperature variations, blast, heat, and pressure during the rocket firing.

Prior electronic and/or solid state intervalometers have not proved fully satisfactory in single fire application because no memory voltage has been available on the aircraft. The only voltage available to such intervalometer has been from the fire control switch in the aircraft, and this voltage is available only at the time of firing either single or ripple fire configurations. Since electronic or solid state devices have required a secondary voltage for a memory retention as to the rockets previously fired, and no such voltage has been available on the aircraft, there has been a definite need for a new and improved intervalometer.

Accordingly, it is a general object of this invention to provide a substantially improved intervalometer which overcomes the defects and drawbacks of the prior art devices.

It is a more particular object of this invention to provide an improved intervalometer for an airborne multiple rocket launcher which in some embodiments requires only a single power source, such as may be controlled by the fire control switch.

It is another object of this invention to provide such an intervalometer having novel circuitry which permits the selection of either ripple fire or single fire by the operation of a single switch.

It is still another object of this invention to provide an intervalometer having improved means for providing a controlled interval during ripple fire and for enabling the interval to be simply and quickly varied to any desired value within the range of operation.

It is a further object of this invention to provide a new and improved intervalometer, as above, which in one advantageous embodiment is comprised of a plurality of semiconductor devices connected in a circuit which includes a multivibrator having a multiple pulse or single pulse output, dependent upon whether the circuit is operating in the ripple fire or single fire mode, and a counter operative to receive such pulse output for firing the rocket squibs in a desired sequence and with a preselected interval between firings.

The novel features which are characteristic of the invention are set forth with particularity in the appended claims. The invention itself, however, both as to its organization and method of operation, together with further objects and advantages thereof, will best be understood by reference to the following description taken in conjunction with the accompanying drawing in which:

FIGURE 2 is a schematic circuit diagram of another alternative embodiment of the invention; and FIGURE 3 is a schematic circuit diagram of still another alternative embodiment of the invention.

Figure 1:
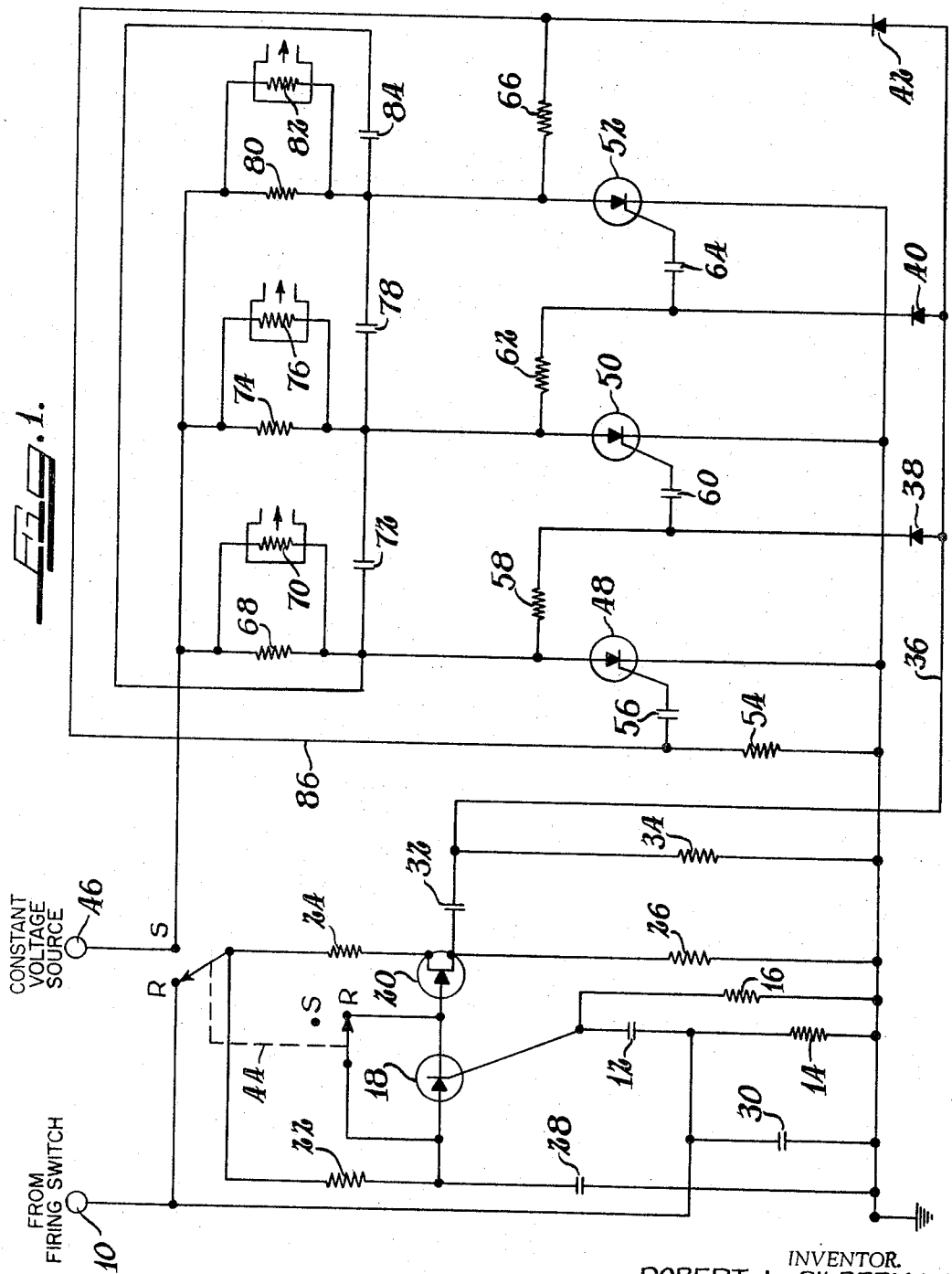
FIGURE 1 is a schematic circuit diagram of one illustrative embodiment of intervalometer incorporating the principles of the present invention.

Referring now to the drawing, and more particularly to FIGURE 1 thereof, there is shown one illustrative embodiment of a rocket launcher intervalometer which incorporates some of the novel features of the present invention. As stated above, this embodiment is disclosed only for the purpose of illustrating the novel features of the present invention and that it is neither intended nor contemplated that the inventive intervalometer be limited to the specific form shown in the drawing since it is manifest that the intervalometer will have many uses in addition to an airborne rocket launcher and that it may comprise any number of counter stages in lieu of the three stage counter illustrated in the embodiment of FIGURE 1.

As shown in FIGURE 1, this illustrative embodiment of the inventive intervalometer advantageously comprises a pulsing section at the left portion of the drawing and a counter section at the right portion of the drawing. The pulsing section of the circuit includes a terminal 10 which is adapted to be connected to the fire control switch and which receives power therefrom whenever the fire control switch is closed to initiate rocket firing. Terminal 10 is connected to the junction of a capacitor 12 and a resistance 14 which, together with the resistance 16 forms a gate trigger circuit for the silicon controlled rectifier 18 which provides a "gating" function. The pulsing section also comprises a multivibrator circuit formed of the unijunction transistor 20, the resistors 22, 24 and 26 and the capacitor 28. It will be appreciated by those skilled in the art that the resistance 22 and the capacitor 28 determine the time constant of the multivibrator circuit when the latter is permitted to oscillate in the manner described in further detail hereinbelow.

The pulse output of the unijunction transistor 20 is coupled through the capacitor 32 and the resistor 34 to a diode input line 36 which is connected in parallel to the diodes 38, 40 and 42 associated with each stage of the counter circuit. In this particular embodiment, the counter stages are connected in the form of a ring counter formed of a plurality of stepping stages adapted to be successively activated in response to the input pulses 36 to fire the rocket squibs, 70, 76, and 82, respectively, associated with each stage of the ring counter circuit.

In accordance with a feature of the present invention, the pulsing section of the intervalometer may be selectively adjusted by means of a simple switching action to provide either a single pulse output for single shot firing or to provide an output having a plurality of properly spaced pulses where ripple firing is desired. As shown in FIGURE 1, the intervalometer is in the ripple firing condition since the switch blades of switch 44 are each engaged with their respective ripple fire contacts. It will be noted that the circuit in the ripple fire condition provides for the silicon controlled rectifier 18 to be short circuited such that the unijunction transistor 20 is directly connected to the junction of resistor 22 and capacitor 28. It also will be noted that the circuit, in this ripple fire condition, causes the unijunction transistor 20 to be connected through the resistor 24 directly to the firing switch terminal 10 rather than to the constant voltage source 46. The operation of the FIGURE 1 circuit in the ripple fire condition will now be described.

When the firing switch is closed, power is supplied to the unijunction multivibrator circuit through the ripple contact of switch 44. As such, the multivibrator will provide a plurality of spaced pulses at its output with the resistor 22 and the capacitor 28 determining the time constant for the multivibrator action. The output pulses from the multivibrator are fed from the unijunction transistor 20 through the coupling capacitor 32 to the diode input line 36 of the ring counter section of the circuit. Each stage of the ring counter has an input diode such as the input diodes 38, 40 and 42 for the three stage counter illustrated in FIGURE 1. Prior to the time the first multivibrator output pulse is received, none of the silicon controlled rectifiers 48, 50 and 52 of the ring counter stages are conducting and all of the input diodes with the exception of the last diode 42 are reverse biased by reason of their connection to the constant voltage source terminal 46. Thus, the input diode 38 is connected through the resistor 58 and the resistor 68 in parallel with the rocket squib 70 to the constant voltage source 46, and the input diode 40 is connected through the resistor 62 and the resistor 74, in parallel with the rocket squib 76, to the constant voltage source terminal 46. The voltage present at terminal 46, which in one embodiment of the invention is a positive 28 volts, is present on the input diodes 38 and 40 to maintain them in a reverse biased condition as long as their associated silicon controlled rectifiers are not conducting. The last stage diode 42, however, is connected by the conductor 86 to the junction of the capacitor 56 and the resistor 54 at the input of the first counter stage rectifier 48.

Since the resistor 54 is connected to ground, the input diode 42 is forward biased to ground. Therefore, the first output pulse generated by the multivibrator and present on the diode input line 36, causes the input diode 42 to conduct through the resistor 54, which, in turn, causes a positive pulse to be applied through the capacitor 56 to the gate electrode of the silicon controlled rectifier 48 on the first counter stage. This causes the rectifier 48 to turn on and conduct. The capacitor 72 connected between the anodes of the rectifiers 48 and 50 charges to substantially the value of the constant voltage source and the rocket squib 70 in the first counter stage fires to launch its associated rocket. When the silicon controlled rectifier 48 in the first counter stage is turned on, the voltage across the resistor 58, connected between the anode of rectifier 48 and diode 38, drops from substantially the value of the constant voltage source to the dropping voltage across the conducting rectifier 48. Since the latter is very close to ground potential, the diode 38 becomes forward biased.

When the next pulse is generated by the unijunction multivibrator and is applied to the diode input line 36, this pulse is conducted through the diode 38, resistance 58, and the conducting rectifier 48 to ground. This causes a positive pulse to be applied through the coupling capacitor 60 to gate the second stage silicon controlled rectifier 50 into its on or conducting condition. The capacitor 72 between the anodes of the rectifiers 48 and 50 becomes connected in parallel across the first stage rectifier 48 when the second stage rectifier 50 is turned on, and consequently, the capacitor 72 discharges to eliminate the holding current in the first stage rectifier 48. As a result, the first stage rectifier 48 turns off or ceases to conduct. At the same time, the rocket squib 76 in the second counter stage fires through the second stage rectifier 50 to launch its respective rocket. The next pulse generated by the unijunction transistor 20 will cause the third stage rectifier to be turned on and the second stage rectifier to be turned off in the manner described hereinabove. In this manner, a ripple fire sequence can be provided through any desired number of counter stages and at an interval determined by the rate of pulse output of the unijunction multivibrator circuit.

When the circuit of FIGURE 1 is to be used for single shot firing, the switch blade 44 is switched to the S or single short contact. The action of the top switch blade serves to remove the unijunction transistor 20 from its connection with the firing switch terminal 10 and instead connects it to the constant voltage source terminal 46. The switching of the lower switch contact removes the short circuit across the one shot silicon controlled rectifier 18 such that the multivibrator output is limited to a single pulse in the manner which now will be described.

When the intervalometer circuit is in the single shot firing condition and the firing switch is closed to apply power to terminal 10, a pulse is applied from terminal 10 through the resistor 14 to ground. This causes a pulse to be applied through the gate trigger capacitor 12 to the gate electrode of the one shot rectifier 18. The rectifier 18 closes or conducts to permit the capacitor 28 to discharge through the emitter of the unijunction transistor 20 which, in turn, produces an output pulse to the coupling capacitor 32 for transmission to the diode input line 36 of the ring counter. This output pulse fires the stage of the ring counter whose associated input diode happens to be in the forward biased condition in the manner explained hereinabove.

When the capacitor 28 in the unijunction multivibrator circuit recharges, there is insufficient anode holding current on the silicon controlled rectifier 18 and it opens or turns off. In this manner, the silicon controlled rectifier 18 acts as a one shot gate which limits the output of the unijunction multivibrator to a single pulse. The capacitor 30 in the gate trigger circuit advantageously is made relatively large and serves to eliminate the effect of fire control switch contact bounce. The resistor 16 in the gate trigger circuit permits leakage from the gate trigger capacitor 12.

Another illustrative embodiment of the present invention is shown in FIGURE 2 of the drawing. The FIGURE 2 intervalometer circuit is similar in many respects to that of FIGURE 1 and similar elements have been designated with similar reference numerals to facilitate an understanding of this aspect of the invention.

Those skilled in the art will appreciate that, in essence, the unijunction multivibrator of FIGURE 2 is the same as the unijunction multivibrator of FIGURE 1. However, it will be noted that the one shot circuit and its trigger have been eliminated. Thus, the output pulses generated by the unijunction multivibrator are applied through the coupling capacitor 32 to the diode input line 36 to which the input diodes 38, 40 and 42 are connected to trigger their respective counter stages in the same manner as that described hereinabove. It further will be noted that the circuit of FIGURE 2 incorporates a ring counter comprised of the silicon controlled rectifiers 48, 50 and 52 interconnected to provide the desired ring counter stepping action in response to the pulses received from the unijunction multivibrator.

Those skilled in the art will note that the circuit of FIGURE 2 differs from the circuit of FIGURE 1 in that the rocket squibs 70, 76 and 82 are no longer connected in the ring counter circuitry. Rather, each rocket squib is connected in series with a second silicon controlled rectifier arranged to be triggered into conduction by each ring counter stage rectifier gate diode. Rocket stage 70 is connected in series with the silicon controlled rectifier 96 which has its gate electrode connected through the capacitor 94 to the input diode 42. Similarly, rocket squib 76 is connected in series with the silicon controlled rectifier 102 which has its gate electrode connected through the capacitor 100 to the input or gate diode 38. In the same fashion, the rocket squib 82 is connected in series with the silicon controlled rectifier 108 which has its gate electrode connected through the capacitor 106 to the input or gate diode 40.

When an output pulse from the multivibrator is applied to the input line 36, it triggers the forward biased ring counter stage and in addition, it triggers the associated silicon controlled rectifier connected in the squib circuit. For example, the first pulse output of the multivibrator passes through the forward biased gate diode 42 and the conductor 86 to trigger the counter stage diode 48 through the coupling capacitor 56. At the same time, since it is connected in parallel, this pulse also passes through the coupling capacitor 94 to trigger the squib silicon controlled rectifier 96. When the squib rectifier 96 conducts, the squib 70 fires in that stage to launch the associated rocket. Also, when the squib rectifier 96 conducts, a pulse is passed through the diode 98 which is connected to the cathode of the squib rectifier 96.

It will be noted that the diode 98, as well as the diodes 104 and 110 of the succeeding stages, is connected to the conductor 160 which, in turn, is connected to the switch blade 44 of the ripple fire-single shot fire switch, with the single shot contact S of this switch being connected through the resistance 92 to the gate electrode of the one shot gate rectifier 90. When the switch blade 44 is in the ripple fire condition, as illustrated in FIGURE 2 of the drawing, the pulse passed through the diode 98 has no effect on the one shot gate 90, and therefore, the FIGURE 2 circuit continues to operate for ripple fire in the manner described hereinabove with respect to the ring counter of FIGURE 1. However, if the switch blade 44 is connected to the S contact so as to be in the single shot condition, then the pulse passed by the diode 98 is applied to the gate electrode of the one shot rectifier 90. This causes the silicon controlled rectifier 90 to conduct such that any subsequent pulses from the unijunction multivibrator are grounded across the conducting rectifier 90. In this manner, the output of the multivibrator has been limited to a single pulse and the desired one shot firing action is achieved.

Still another highly advantageous alternative embodiment of the invention is illustrated in FIGURE 3 of the drawing. This embodiment is highly desirable and practical in that it is reduced to a minium number of components required and is operative from a single power source controlled by the firing switch. As shown in FIGURE 3, the firing switch terminal 10 is connected through the resistance 112 to a unijunction multivibrator arranged in substantially the same manner as the multivibrator disclosed in the FIGURES 1 and 2 circuits. However, in this embodiment, the junction of the multivibrator resistances 22 and 24 is connected to the switch blade 44 of the ripple fire-single shot fire switch, while the unijunction transistor 20 and resistor 26 are connected through the capacitor 154 to the gate electrode of the single shot rectifier 152.

The output of the unijunction multivibrator is coupled through the capacitor 32 and the resistance 34 to the input line 36 to which the input diodes 116, 126, 136 and 146 are coupled to the respective stepping switch stages. Those skilled in the art will appreciate that the multistage stepping circuit of FIGURE 3 is not connected as a ring counter, in the manner of the circuit described hereinabove, but rather, functions as a stepping circuit wherein each input pulse from the multivibrator transfers the conducting condition of the squib circuit rectifiers from one stage to the next succeeding stage in a successive fashion.

As shown in FIGURE 3, the novel intervalometer is in the ripple fire condition, with the switch blade 44 being connected to the R or ripple fire contact of the switch. In this condition, the output pulses from the unijunction multivibrator which are generated when power is applied to the firing switch terminal 10, are passed through the capacitor 32 to the input diode 116 of the first stage of the stepping circuit. The remaining input diodes 126, 136 and 146 to which the input pulse is applied do not pass the pulse because they are reverse biased through the rocket squibs and the resistances 124, 134 and 144 connected between the rocket squib of the preceding stage and such input diodes.

Accordingly, the first pulse from the multivibrator only passes the input diode 116 of the first stage. This pulse also passes through the resistances 114 and 112 to ground and through the coupling capacitor 118 to the gate electrode of the first stage silicon controlled rectifier 120. This first pulse will cause the rectifier 120 to fire to energize its squib 70 for launching the associated rocket. As a result, the rocket squib 70 burns out which causes the next succeeding diode 126 to become forward biased through the resistance 124 and the resistance 122 to ground. Consequently, the next output from the multivibrator which is applied to the several input diodes, will pass only the input diode 126 of the second stage to trigger its associated squib rectifier 130 and activate the rocket squib 76. In this manner, the process is repeated with the successive output pulses generated by the multivibrator causing the conducting condition of the stepping circuit to be transferred successively from one squib rectifier to the next succeeding squib rectifier to provide ripple fire of the launched rocket.

When the switch blade 44 is engaged with the S, or single shot fire, contact, the rectifier 152 acts as a one shot to limit the output of the multivibrator to a single pulse. Thus, the first pulse output of the multivibrator is passed through the coupling capacitor 154 to trigger the single shot rectifier 152 into conduction. It will be apparent to those skilled in the art that the conduction of the rectifier 152 serves to short circuit the operating voltage of the unijunction multivibrator to ground such that no succeeding pluses can be generated therefrom to step the stepping circuit. It also will be appreciated that the input resistance 112 connected to the firing switch terminal 10 and the input capacitor 114 act as a time delay circuit to allow the rocket squib stages sufficient time to develop operating voltage before the first pulse is generated by the unijunction multivibrator.

As described above, the circuit of FIGURE 3 has the highly desirable advantage of requiring fewer components than the circuits of FIGURES 1 and 2. In addition, by the use of a transistorized converter in each stage, the squib can be connected to the silicon controlled rectifier cathodes, rather than the anodes, to provide constant ground on the squibs, if this mode of operation is desired.

While there has been shown and described a specific embodiment of the present invention, it will, of course, be understood that various modifications and alternative constructions may be made without departing from the true spirit and scope of the invention. Therefore, it is intended by the appended claims to cover all such modifications and alternative constructions as fall within their true spirit and scope.

What is claimed as the invention is:

1. An improved intervalometer comprising the combination of a multivibrator, means for energizing said multivibrator to generate a plurality of spaced pulses at its output, a multistage stepping circuit, means for applying the pulse generated at the output of said multivibrator to said stepping circuit for causing said stages to be activated in succession to thereby provide a plurality of successive event initiating signals, gate means adapted to be connected in circuit with said multivibrator for limiting the output of the latter to a single pulse such that only one stage of the stepping circuit is activated to provide a single event initiating signal, and selectively operable switching means in circuit with said gate means for connecting said gate means to said multivibrator to permit only a single pulse output therefrom or for disconnecting said gate means from said multivibrator to permit a plurality of spaced pulses at the output thereof.

2. An improved intervalometer comprising the combination of a pulse source, means for energizing said pulse source to generate a plurality of spaced pulses at its output, a multistage stepping circuit, means for applying the pulses generated at the output of said pulse source to stepping circuit for causing said stages to be activated in succession to thereby provide a plurality of successive event initiating signals, gate means adapted to be connected in circuit with said pulse source for limiting the output of the latter to a single pulse such that only one stage of the stepping circuit is activated to provide a single event initiating signal, and selectively operable switching means in circuit with said gate means for connecting said gate means to said pulse source to permit only a single pulse output therefrom or for disconnecting said gate means from said pulse source to permit a plurality of spaced pulses at the output thereof.

3. An improved intervalometer for a rocket launcher comprising the combination of a multivibrator, means for energizing said multivibrator to generate a plurality of spaced pulses at its output, a multistage stepping circuit having a rocket launching squib in each stage, means for applying the pulses generated at the output of said multivibrator to said stepping circuit for causing said stages to be activated in succession to thereby provide a plurality of successive squib energizing signals for causing successive launching of the rockets associated therewith, gate means adapted to be connected in circuit with said multivibrator for limiting the output of the latter to a single pulse such that only one stage of the stepping circuit is activated to provide a single squib energizing signal for causing only a single shot launching and selectively operable switching means in circuit with said gate means for connecting said gate means to said multivibrator to permit only a single pulse output therefrom or for disconnecting said gate means from said multivibrator to permit a plurality of spaced pulses at the output thereof.

4. An improved intervalometer comprising the combination of a multivibrator, means for energizing said multivibrator to generate a plurality of spaced pulses at its output, a multistage ring counter circuit, means for applying the pulses generated at the output of said multivibrator to said ring counter circuit for causing said stages to be activated in succession to thereby provide a plurality of successive event initiating signals, said signals being spaced from each other by an amount determined by the cyclic period of said multivibrator, gate means adapted to be connected in circuit with said multivibrator for limiting the output of the latter to a single pulse such that only one stage of the stepping circuit is activated to provide a single event initiating signal, said gate means comprising a gate trigger circuit and a one-shot gate circuit connected to the output of the gate trigger circuit and adapted to be energized thereby, and selectively operable switching means in circuit with said one-shot gate circuit for connecting the latter to said multivibrator to permit only a single pulse output therefrom or for disconnecting said one-shot gate circuit from said multivibrator to permit a plurality of spaced pulses at the output thereof.

5. An improved intervalometer comprising the combination of a multivibrator, means for energizing said multivibrator to generate a plurality of spaced pulses at its output, a multistage stepping circuit having a separate gate diode at the input of each stage, means applying a reverse bias to all but one of said diodes and a forward bias to the remaining diode, means for applying the pulses generated at the output of said multivibrator to said gate diodes for causing said stages to be activated in succession to thereby provide a plurality of successive event initiating signals, the stage having the forward biased diode being the first to be activated, and with the remaining diodes being successively forward biased in response to said multivibrator pulses to enable said stages to be activated in succession, gate means adapted to be connected in circuit with said multivibrator for limiting the output of the latter to a single pulse such that only one stage of the stepping circuit is activated to provide a single event initiating signal, and selectively operable switching means in circuit with said gate means for connecting said gate means to said multivibrator to permit only a single pulse output therefrom or for disconnecting said gate means from said multivibrator to permit a plurality of spaced pulses at the output thereof.

6. An improved intervalometer comprising the combination of a multivibrator, means for energizing said multivibrator to generate a plurality of spaced pulses at its output, a multistage stepping circuit, means for applying the pulses generated at the output of said multivibrator to said stepping circuit for causing said stages to be activated in succession to thereby provide a plurality of successive event initiating signals, said stepping circuit comprising a multistage counter circuit having a normally non-conducting element in each stage, a second normally non-conducting element associated with each stage, a plurality of gate diodes, there being a single gate diode connected to said first and second elements in each stage, and means for biasing said diodes to conduct successively in response to the pulses generated by said multivibrator to thereby successively trigger the pair of normally non-conducting elements in each stage into conduction, gate means adapted to be connected in circuit with said multivibrator for limiting the output of the latter to a single pulse such that only one stage of the stepping circuit is activated to provide a single event initiating signal, and selectively operable switching means in circuit with said gate means for connecting said gate means to said multivibrator to permit only a single pulse output therefrom or for disconnecting said gate means from said multivibrator to permit a plurality of spaced pulses at the output thereof.

7. An improved intervalometer comprising the combination of a multivibrator, means for energizing said multivibrator to generate a plurality of spaced pulses at its output, a multistage stepping circuit, means for applying the pulses generated at the output of said multivibrator to said stepping circuit for causing said stages to be activated in succession to thereby provide a plurality of successive event initiating signals, gate means adapted to be connected in circuit with said multivibrator for limiting the output of the latter to a single pulse such that only one stage of the stepping circuit is activated to provide a single event initiating signal, said gate means comprising a normally non-conducting element adapted to be connected across the output of said multivibrator, said normally non-conducting element when connected across said multivibrator being triggered into conduction by the first output pulse therefrom to inhibit the generation of any further output pulses, and selectively operable switching means in circuit with said gate means for connecting said gate means to said multivibrator to permit only a single pulse output therefrom or for disconnecting said gate means from said multivibrator to permit a plurality of spaced pulses at the output thereof.

8. An improved intervalometer comprising the combination of a multivibrator, means for energizing said multivibrator to generate a plurality of spaced pulses at its output, a multistage stepping circuit, each of said stages comprising a normally non-conducting element in series with an output load device, means for applying the pulses generated at the output of said multivibrator to said stepping circuit for causing said each of said normally non-conducting elements to be triggered in succession to thereby provide a plurality of successive event initiating signals to their respective output load devices, gate means adapted to be connected in circuit with said multivibrator for limiting the output of the latter to a single pulse such that only one stage of the stepping circuit is activated to provide a single event initiating signal, and selectively operable switching means in circuit with said gate means for connecting said gate means to said multivibrator to permit only a single pulse output therefrom or for disconnecting said gate means from said multivibrator to permit a plurality of spaced pulses at the output thereof.

9. An improved intervalometer comprising the combination of a multivibrator, means for energizing said multivibrator to generate a plurality of spaced pulses at its output, a multistage stepping circuit, each of said stages comprising a normally non-conducting element in series with an output load device, means for applying the pulses generated at the output of said multivibrator to said stepping circuit for causing each of said normally non-conducting elements to be triggered in succession to thereby provide a plurality of successive event initiating signals to their respective output load devices, gate means adapted to be connected in circuit with said multivibrator for limiting the output of the latter to a single pulse such that only one stage of the stepping circuit is activated to provide a single event initiating signal, said gate means comprising a normally non-conducting element adapted to be connected across said multivibrator and effective when so connected to be triggered into conduction by the first output pulse from said multivibrator to prevent any further pulses from being applied to said stepping circuit, and selectively operable switching means in circuit with said gate means for connecting said gate means to said multivibrator to permit only a single pulse output therefrom or for disconnecting said gate means from said multivibrator to permit a plurality of spaced pulses at the output thereof.

10. An improved intervalometer for a rocket launcher comprising the combination of a multivibrator, means for energizing said multivibrator to generate a plurality of spaced pulses at its output, a multistage stepping circuit, each of said stages comprising a normally non-conducting silicon controlled rectifier connected in series with a rocket launching squib, means for applying the pulses generated at the output of said multivibrator to said stepping circuit for causing each of said silicon controlled rectifiers to be triggered in succession to thereby successively activate said rocket launching squibs to provide ripple fire of the rockets, gate means adapted to be connected in circuit with said multivibrator for limiting the output of the latter to a single pulse such that only one stage of stepping circuit is triggered to activate its rocket launching squib, and selectively operable switching means in circuit with said gate means for connecting said gate means to said multivibrator to permit only a single pulse output therefrom for single shot rocket fire or for disconnecting said gate means from said multivibrator to permit a plurality of spaced pulses at the output thereof for ripple fire.

References Cited by the Examiner
UNITED STATES PATENTS

| | | | |
|---|---|---|---|
| 2,832,265 | 4/1958 | Reid et al. | 200—114 |
| 2,853,563 | 9/1958 | Bole et al. | 200—8 |
| 3,122,058 | 2/1964 | Wyser | 89—1.7 |
| 3,133,231 | 5/1964 | Fail et al. | 317—80 |
| 3,225,695 | 12/1965 | Kapp et al. | 102—70.2 |

RICHARD M. WOOD, *Primary Examiner.*

V. Y. MAYEWSKY, *Assistant Examiner.*